United States Patent [19]

Shimaoka et al.

[11] Patent Number: 5,163,329
[45] Date of Patent: Nov. 17, 1992

[54] SEMICONDUCTOR PRESSURE SENSOR

[75] Inventors: Keiichi Shimaoka; Osamu Tabata; Susumu Sugiyama, all of Aichi, Japan

[73] Assignee: Kabushiki Kaisha Toyota Chuo Kenkyusho, Aichi, Japan

[21] Appl. No.: 635,953

[22] Filed: Dec. 28, 1990

[30] Foreign Application Priority Data

Dec. 29, 1989 [JP] Japan .................................. 1-341141
Dec. 29, 1989 [JP] Japan .................................. 1-341142

[51] Int. Cl.⁵ .......................... G01L 7/08; G01L 9/06
[52] U.S. Cl. ........................................ 73/721; 73/727; 338/4; 338/42
[58] Field of Search ............... 73/721, 727; 29/621.1; 338/4, 42

[56] References Cited

U.S. PATENT DOCUMENTS

| 4,766,666 | 8/1988 | Sugiyama et al. | 73/721 |
| 4,771,638 | 9/1988 | Sugiyama et al. | 73/721 |
| 4,784,721 | 11/1988 | Holmen et al. | 29/621.1 |

Primary Examiner—Donald O. Woodiel
Attorney, Agent, or Firm—Oblon, Spivak, McClelland, Maier & Neustadt

[57] ABSTRACT

A semiconductor pressure sensor having a diaphragm formed over the surface of a semiconductor substrate by thin film forming technique is provided. The sensor comprises: a sacrificial film including a vanishable portion covering a pressure receiving region on the major surface of the semiconductor substrate and a diaphragm support portion covering the periphery of the pressure receiving region, the vanishable portion having an isotropic etching property along the pressure receiving region and the diaphragm support portion having an etching-resistant property; an insulation diaphragm film having an etching-resistant property formed on the major surface of the semiconductor substrate over the sacrificial film; at least one etching solution inlet port formed through the insulation diaphragm film to reach the vanishable portion of the sacrificial film; a reference pressure chamber formed by etching and removing at least the vanishable portion of the sacrificial film with an etching solution poured through the inlet port; and at least one strain gauge formed on the insulation diaphragm film in place at the pressure receiving region. The peripheral region of the movable diaphragm can be formed into a flat configuration without any stepped structure. Thus, the semiconductor pressure snesor has an improved characteristics.

11 Claims, 8 Drawing Sheets

SEMICONDUCTOR PRESSURE SENSOR

BACKGROUND OF THE INVENTION

1. Field of the Invention

The present invention relates to a semiconductor pressure sensor and a method for manufacturing the same. Particularly, the present invention concerns an improved semiconductor pressure sensor including a diaphragm formed on a semiconductor substrate surface using a film forming technique and an improved process of making such a semiconductor pressure sensor.

2. Description of the Related Art

FIG. 12 shows a semiconductor pressure sensor constructed in accordance with the prior art.

Such a semiconductor pressure sensor comprises a semiconductor substrate 10 and a vanishable film 12 formed on the major surface of the substrate at the pressure receiving region, the vanishable film having a preselected plane configuration and an isotropic etching property. The major surface of the semiconductor substrate 10 also includes an insulation diaphragm film 14 formed thereon over the vanishable film 12 through the entire area of the major surface, the insulation diaphragm being made of etching-resistant material. The diaphragm film 14 includes at least one strain gauge 16 located in place on the pressure receiving region thereof. The diaphragm film and strain gauge 14, 16 are coated with an insulation passivation film 18 of etching-resistant material. The insulation passivation film 18 includes contact holes 20 formed therethrough at positions opposed to the ends of the strain gauge 16. The opposite ends of the strain gauge 16 are connected to electrodes 22 through the contact holes 20.

The semiconductor pressure sensor further includes at least one etching solution inlet port 24 formed in place at the pressure receiving region thereof, the inlet port 24 extending from the outer surface of the pressure sensor through the insulation passivation film 18 and the diaphragm film 14 to the vanishable film 12. When the etching solution is fed into the pressure sensor through the inlet port 24, the vanishable film 12 and a portion of the substrate 10 can be dissolved off by the etching solution. In such a manner, a reference pressure chamber 26 will be defined by the substrate 10 and the diaphragm film 14.

If such a pressure sensor is used as an absolute pressure measurement type sensor, all the etching liquid inlet ports 24 are sealingly closed by sealing members 24a while maintaining the reference pressure chamber 26 vacuum.

In such an arrangement, a movable diaphragm 14a is provided by the diaphragm film 14 located on the upper side of the reference pressure chamber 26.

When a pressure is applied to the pressure sensor, the movable diaphragm 14a is deflected in direct proportion to the magnitude of the applied pressure. The deflection in the movable diaphragm 14a causes the strain gauge 16 to vary its resistance. If a detection signal created in the deflected strain gauge 16 is taken out through the electrodes 22, that signal can be used to determine the absolute pressure applied to the front face of the movable diaphragm 14a.

However, the prior art has the following problems:

(a) The prior art forms a semiconductor pressure sensor by first machining the vanishable film 12 of polycrystal silicon into a desired configuration and then forming the diaphragm film 14 of silicon nitride over the vanishable film 12 on the substrate 10, the diaphragm 14 having an etching-resistant property.

Thus, the peripheral portion of the movable diaphragm 14a will be supported by the substrate 10 through a stepped structure A as shown by dashed line in FIG. 12. If a pressure is applied to the upper face of the movable diaphragm 14a, the latter cannot resist the pressure strongly and be yet supported under the same condition as it was supported before the pressure was applied to the diaphragm 14a. Therefore, the accuracy of measurement in the strain gauge 16 may be degraded.

If such a semiconductor pressure sensor is repeatedly used, the stepped structure A in the movable diaphragm 14a is subject to fatigue. It is thus difficult to use the semiconductor pressure sensor for a prolonged time period with an invariable accuracy.

(b) In the prior art pressure sensor as shown in FIG. 12, the reference pressure chamber 26 is formed by dissolving a part of the substrate 10 and the vanishable film 12.

On the contrary, the inventors have studied whether the reference pressure chamber 26 Can be formed only by dissolving the vanishable film 12 without dissolving any part of the substrate 10. As a result, the inventors have found that the above matter can be attained by forming an insulation film 28 of etching-resistant material on the surface of the semiconductor substrate 10 and then forming the vanishable film 12 and the diaphragm 14 sequentially over the insulation film 28, as shown by broken line in FIG. 12.

If the diaphragm film 14 of silicon nitride is formed on the semiconductor substrate 10 as made of silicon by the use of the vacuum CVD technique, however, an internal tensile stress will be produced due to the differential thermal expansion between the silicon nitride diaphragm film 14 and the silicon substrate 10. In such a case, if the vanishable film 12 between the silicon nitride diaphragm film 14 and the silicon substrate 10 is dissolved off to form the reference pressure chamber 26, a bending moment will be created at the peripheral stepped portion A of the movable diaphragm 14a, leading to any deformation of the movable diaphragm 14a toward the semiconductor substrate 10.

Where the reference pressure chamber 26 is formed only by dissolving the vanishable film 12, therefore, the movable diaphragm 14a may be flexed against the substrate into contact with the insulation film 28 due to the bending moment, depending on the thickness in the vanishable film 12 and movable diaphragm 14a. Thus, the semiconductor pressure sensor may function improperly.

SUMMARY OF THE INVENTION

It is therefore an object of the present invention to provide a semiconductor pressure sensor which has an improved performance obtained by providing a movable diaphragm with a flat or non-stepped periphery.

To this end, the present invention provides a semiconductor pressure sensor comprising:

a semiconductor substrate;

a sacrificial film including a vanishable portion covering the pressure receiving region in the major surface of said semiconductor substrate and a diaphragm support portion covering around the pressure receiving region, said vanishable portion being formed to have an isotropic etching property along said pressure receiving region and said diaphragm support portion being formed to have an etching-resistant property;

an insulation diaphragm film formed o the major surface of said semiconductor substrate over said sacrificial film, said insulation diaphragm film having an etching-resistant property;

at least one etching solution inlet port formed to extend through said insulation diaphragm film to the vanishable portion of said sacrificial film;

a reference pressure chamber formed by etching and removing at least the vanishable portion of said sacrificial film by an etching solution fed through said etching solution inlet port; and at least one strain gauge formed on said insulation diaphragm film in place at the pressure receiving region thereof.

The semiconductor pressure sensor of the present invention will now be described more concretely.

FIG. 1 shows a plan view of the basic structure of a semiconductor pressure sensor constructed in accordance with the present invention while FIG. 2 shows a cross-sectional view of the pressure sensor shown in FIG. 1.

The semiconductor pressure sensor of the present invention comprises a sacrificial film 42 formed on the major surface of a semiconductor substrate 40.

The present invention is characterized by that said sacrificial film 42 is formed to include a vanishable portion 44 covering the pressure receiving region of the semiconductor substrate 40 and a diaphragm support portion 46 covering the periphery of the pressure receiving region of the substrate 40, the vanishable portion 44 having an isotropic etching property extending along the pressure receiving region and the diaphragm support portion having an etching-resistant property.

The sacrificial film 42 may be formed by forming a film of polycrystalline silicon on the major surface of the semiconductor substrate 40. A portion of the sacrificial film 42 which is to be used as the diaphragm support portion 46 is formed to have a desired etching-resistant property, for example, by ion implanting or diffusing boron as impurity. Another portion of the sacrificial film 42 where the impurity is not implanted or diffused, that is, a portion of the sacrificial film which is surrounded by the diaphragm support portion 46 functions as the vanishable portion 44 having an isotropic property along the pressure receiving region.

The major surface of the semiconductor substrate 40 is covered by an insulation diaphragm film 48 of etching-resistant material over the sacrificial film 42 through the entire area. The diaphragm film 48 includes at least strain gauge 50 formed thereon in place at the pressure receiving region. The diaphragm film 48 is formed to be flat over the entire area of the sacrificial film 42 without any stepped structure on the periphery of the pressure receiving region as in the prior art.

In one aspect of the present invention, it is preferred that the diaphragm film 48 and strain gauge 50 are further covered with an insulation passivation film 52 of etching-resistant material.

This insulation passivation film 52 includes contact holes 54 leading to the opposite ends of the strain gauge 50. A plurality of electrodes 56 are connected with the opposite ends of the strain gauge 50 through these contact holes 54.

The semiconductor pressure sensor further comprises at least one etching solution inlet port 58 which is formed thereon in place at the pressure receiving region of the pressure sensor, the inlet port 58 extending from the outer face of the pressure sensor through the insulation protective film 52 and the diaphragm film 48 to the vanishable portion 44. When an etching solution is fed into the pressure sensor through the inlet port 58, a portion of the substrate 40 and the entire vanishable portion 44 are etched and removed to form a reference pressure chamber 60 which is surrounded by the substrate 40 and the diaphragm film 48. Thus, the diaphragm film 48 located on the upper side of the reference pressure chamber 60 functions as a movable diaphragm 100.

In accordance with the present invention, the diaphragm film 48 defining the movable diaphragm 100 is formed to be flat without any stepped structure on the periphery A of the pressure receiving region. Even if a pressure is applied to the upper side of the movable diaphragm 100, it will be supported at its periphery by the diaphragm support portion 46 with a sufficient strength. Thus, the semiconductor pressure sensor can be stably used for a prolonged time period.

However, the present invention is not limited to the above-mentioned arrangement and may provide a reference pressure chamber 60 formed by forming an insulation layer 64 of etching-resistant property between the semiconductor substrate 40 and the sacrificial film 42 and then etching only the vanishable portion 44, as shown in FIG. 6.

The etching solution inlet port 58 is sealed by a sealing member 62 entirely or partially, if necessary.

The semiconductor pressure sensor having the above-mentioned arrangement will be described in connection with both measurements of absolute pressure and differential pressure.

In the semiconductor pressure sensor of the present invention, the diaphragm film 48 located on the upper side of the reference pressure chamber 60 functions as the movable diaphragm 100. If said insulation protective film 52 is provided other than the diaphragm film 48, a stack consisting of the diaphragm film 48 and the insulation passivation film 52 will function as the movable diaphragm 100.

If the pressure sensor of the present invention is used as an absolute pressure measurement type sensor, the pressure reference chamber 60 is maintained vacuum while at the same time all the etching solution inlet ports 58 are sealingly closed by sealing members 62. When a pressure is applied to this pressure sensor, the movable diaphragm 100 is deflected in direct proportion to the absolute pressure applied thereto. The deflection then cause the strain gauge 50 to vary its resistance.

It is now assumed that a pair of strain gauges 50-2 and 50-4 are positioned on the diaphragm film 48 centrally at the pressure receiving region thereof while another pair of strain gauges 50-1 and 50-3 are arranged on the diaphragm film 48 at the periphery of the pressure receiving region. One set of strain gauges will be subject to compression strain while another set of strain gauges will be subject to tensile strain. As a result, the resistance in one set of strain gauges will be increased while the resistance in the other set of strain gauges will be decreased.

If the two sets of strain gauges 50-1, 50-2, 50-3 and 50-4 are so arranged that they are bridge connected together through electrodes 56-1, 56-2, 56-3 and 56-4 to sum their resistances, with a pair of opposed electrodes being connected to a power supply, another pair of electrodes can output a voltage in direct proportion to the absolute pressure applied to the movable diaphragm 100.

Since according to the present invention, the movable diaphragm 100 is of a flat configuration having no stepped structure between the movable diaphragm 100 and the diaphragm support portion 46 located at the the periphery A of the movable diaphragm 100, the latter can be supported by the diaphragm support portion 46 with a sufficient strength. Even if the movable diaphragm 100 receives repeated pressure, it will not be subject to fatigue at its periphery. Thus, the strain gauge 50 can output a stable signal corresponding to the applied pressure even if it is utilized for a prolonged time period. Consequently, accurate measurement of pressure can be accomplished for a prolonged time period.

If the semiconductor pressure sensor of the present invention is used as a differential pressure measurement type sensor, the movable diaphragm 100 is shaped into a rectangular configuration and longitudinally bisected into two sections, as shown in FIGS. 3 and 4. At least one strain gauge 50 is located on one of these diaphragm sections while an etching liquid inlet port 58 is arranged on the other diaphragm section. The etching liquid inlet port 58 may include a pressure inducting means for inducting a pressure $P_2$ used in comparison.

The semiconductor pressure sensor of the present invention can be used as a differential pressure measurement type sensor which comprises a plurality of etching liquid inlet ports 58, some of these inlet ports being sealingly closed by sealing members 60 with the other inlet ports remaining opened Each of the opened inlet ports 58 may include pressure inducting means for inducting a comparison pressure $P_2$ into the reference pressure chamber 60.

Thus, a differential pressure across the movable diaphragm 100 can be accurately measured from variations of resistance in the strain gauge 50 as in said absolute Pressure measurement type sensor.

The semiconductor pressure sensor of the present invention may comprise a reference pressure chamber 60 which is formed only by etching the vanishable portion 44, as shown in FIG. 6.

In the arrangement just mentioned, the movable diaphragm 100 may contact the surface of the substrate 40 resulting in malfunction if there is any stepped structure on the periphery of the movable diaphragm 100. However, the present invention provides a flat diaphragm film 48 as a whole without any stepped structure on the periphery thereof. Therefore, the semiconductor pressure sensor will create no initial deflection in the movable diaphragm 100 due to the internal tensile stress therein. The movable diaphragm 100 can be stably actuated without any contact with the substrate 40.

Method for Manufacturing the Semiconductor Pressure Sensor

A method of making the semiconductor pressure sensor in accordance with the principle of the present invention will now be described by way of example.

First of all, a sacrificial film 42 having an isotropic etching property is formed on the major surface of a semiconductor substrate 40 at the pressure receiving region thereof.

If a reference pressure chamber 60 is to be formed in such a manner as shown in FIGS. 1 and 2, the sacrificial film 42 having the isotropic etching property will be formed on the entire major surface of the semiconductor substrate 40.

If the pressure reference chamber 60 is to be formed in such a manner as shown in FIG. 6, an insulation film 64 of etching-resistant material is first formed on the major surface of the semiconductor substrate 40 through the entire region. The insulation film 64 is then covered with the sacrificial film 42.

After the sacrificial film 42 has been formed, it is treated at the periphery of the pressure receiving region thereof to have an etching-resistant property.

This treatment may be attained by any one of various conventional techniques. For example, if a sacrificial film 42 is to be formed of polycrystalline silicon having an isotropic etching property, boron may be added or diffused, as impurity, into a region of the film 42 other than the pressure receiving region to provide the etching-resistant property. The impurity containing region is then formed into a diaphragm support portion 46 having the etching-resistant property. On the other hand, the other region which does not contain the impurity will be formed into a vanishable portion 44 having the isotropic etching property.

After the sacrificial film 42 has been formed in such a manner, an insulation diaphragm film 48 of etching-resistant material is formed over the sacrificial film 42. The diaphragm film 48 is so formed as to be flat throughout the entire area of the sacrificial film 42 without any stepped structure at the periphery of the pressure receiving region.

At least one strain gauge 50 is located on the diaphragm film 48 in place at the pressure receiving region thereof. Both the strain gauge 50 and diaphragm film 48 are then covered with an insulation protective film 52 of etching-resistant material.

After the strain gauge 50 and diaphragm film 48 have been covered with the insulation protective film 52, at least one etching solution inlet port 58 is then formed through the films 52 and 48 in the pressure receiving region at a preselected position so as to reach the vanishable portion 44.

The present invention is further characterized by that when an anisotropic etching solution is poured into the assembly through the inlet port 58, the entire vanishable portion 44 of the sacrificial film 42 is etched and removed to form the reference pressure chamber 60 and the movable diaphragm 100 having its flat peripheral area A.

If the anisotropic etching solution is poured into such a semiconductor pressure sensor as shown in FIG. 2, the whole of the vanishable portion 44 and a portion of the semiconductor substrate 40 are etched and removed to form the reference pressure chamber 60 and the movable diaphragm 100.

In such a semiconductor pressure sensor as shown in FIG. 6, the substrate 40 will be prevented from being etched under the influence of the insulation film 64 while the vanishable portion 44 of the sacrificial film 42 is etched and removed to form the reference pressure chamber 60 and the movable diaphragm 100.

Steps required to etch the corresponding parts in such a semiconductor pressure sensor as shown in FIGS. 1 and 2 will be described in detail below.

FIG. 10 shows a graph illustrating etching properties in the respective members, in which a first curve A represents the transverse etching property of a polycrystalline silicon used in the vanishable portion 44 of the sacrificial film 42; a second curve B depicts the longitudinal etching property of a single-crystal silicon used in the semiconductor substrate 40; and a third curve C represents the transverse etching property of a polycrystalline silicon film into which boron is ion implanted or diffused and which is used in the diaphragm support portion 46 of the sacrificial film 42.

FIG. 11 illustrates various steps in the etching process when an anisotropic etching solution is poured into the sensor assembly through the inlet port 58: FIG. 11(a) shows a step before the etching is carried out by the anisotropic etching solution; FIG. 11(b) shows the beginning of the etching process; FIG. 11(c) shows the intermediate step in the etching process; and FIG. 11(d) shows the completion of the etching process.

When the anisotropic etching solution is poured from the inlet port 58, the vanishable portion 44 will be isotropically etched in such a sequence as represented by the order going from FIG. 11(a) to FIG. 11(c). The central part of the vanishable portion 44 is first vanished, the resulting opening being gradually enlarged with passage of time in accordance with the curve A shown in FIG. 10.

In the single-crystal silicon substrate 40 exposed with the vanishing of the vanishable portion 44, the anisotropic etching proceeds with the enlargement of the opening in the vanishable portion 44 in the longitudinal direction, according to the curve B shown in FIG. 10.

Now assuming that the opening area of the vanishable portion 44 is constant, the depth of etching in the single-crystal silicon substrate 40 terminates at a point in which right- and left-hand crystal (111) planes intersect each other. In accordance with the present invention, however, the opening area of the vanishable portion 44 can be continuously enlarged with passage of time. Following this enlargement, thus, the etching step of the polycrystalline silicon substrate 40 will also proceed in the longitudinal direction as shown in FIG. 11(c).

When the whole of the vanishable portion 44 is etched and removed as shown in FIG. 11(d), the transverse etching property is changed from the first curve A of FIG. 10 relating to the vanishable portion 44 to the curve C of FIG. 10 relating to the diaphragm support portion 46 of the sacrificial film 42. Thus, the speed in the transverse etching is reduced to one several tenths.

As the etching step reaches such a state as shown in FIG. 11(d), the enlargement of the transverse opening area is substantially stopped such that the depth of etching in the single-crystal silicon substrate 40 terminates at a point in which the crystal (111) planes intersect each other as shown in FIG. 11(d).

In other words, the present invention determines the size of the reference pressure chamber 60 to be worked by the shape of the vanishable portion 44 in the sacrificial film 42. Further etching will not substantially vary the shape of the reference pressure chamber.

Although it has been described that the etching process is continued until the etching of the semiconductor substrate 40 in the direction of depth terminates substantially, the hollow shape of the reference pressure chamber 60 is not essentially important in the present invention. It is sufficient that the reference pressure chamber 60 is of a hollow configuration sufficient to permit the free deflection of the movable diaphragm 100 on application of a pressure. Therefore, the advantage of the present invention will be provided if a sufficient space can be formed by forming an insulation film 64 having an etching-resistant property between a semiconductor substrate 40 and a sacrificial film 42 and then etching and removing only the vanishable portion 44 to form the reference pressure chamber 60 without need of etching the semiconductor substrate 40.

In such a manner, the present invention can form the reference pressure chamber 60 constructed between the substrate 40 and the diaphragm film 48, based on the size of the vanishable portion 44. Since the diaphragm film 48 located on the upper side of the reference pressure chamber 60 is formed of etching-resistant material, it will not be substantially etched. As a result, the stack consisting of the diaphragm film 48 and the insulation protective film 52 will function as a movable diaphragm 100 for the reference pressure chamber 60.

In according to the present invention, thus, that portion of the diaphragm film 48 which functions as a movable diaphragm and the peripheral portion of the diaphragm film 48 which is fixedly supported by the diaphragm support portion 46 are formed to be flat without any step. Therefore, the movable diaphragm 100 can be stably supported and fixed at its periphery, by the diaphragm support portion 46 with a sufficient strength.

When a pressure is applied to the pressure sensor, the accuracy of measurement will not be degraded due to the condition in which the movable diaphragm 100 is supported. Therefore, the semiconductor pressure sensor of the present invention can stably measure pressure for a prolonged time period.

In addition, the present invention can suppress any initial deflection in the movable diaphragm 100 due to the internal tensile stress therein. Even though the reference pressure chamber 60 is formed in such a manner as shown in FIG. 6, the movable diaphragm 100 will never contact the insulation film 64 due to the initial deflection of the diaphragm. This also causes the semiconductor pressure sensor to measure pressure more stably for a prolonged time period.

In accordance with the present invention, further, the thickness of the movable diaphragm 100 is equal to the total thickness of the diaphragm film 48 plus the insulation protective film 52. Therefore, any one of the well-known film forming techniques may be used to form the diaphragm 100 into a preselected thickness accurately.

It is further noted that the etching solution inlet port 58 is sealingly closed by the sealing member 62, if needed, after the reference pressure chamber 60 and the movable diaphragm 100 have been formed. If the pressure sensor of the present invention is to be used as an absolute pressure measurement type sensor, the etching solution inlet port 58 is sealingly closed by the sealing member 62 while maintaining the reference pressure chamber 60 vacuum. On the contrary, if the pressure sensor is to be used as a differential pressure measurement type sensor, the etching solution inlet port 58 may include means for inducting the second pressure into the reference pressure chamber 60.

The present invention further requires electrode means for taking out signals from the strain gauge 50 since the latter is covered with the insulation protective film 52. For such a purpose, the insulation protective film 52 is formed with contact holes 54 at positions corresponding to the opposite ends of the strain gauge 50. Electrodes 56 are connected with the strain gauge 50 through these contact holes 54. In such a manner, variations of resistance in the strain gauge 50 can be detected through the electrodes 56.

Comparison with the Prior Art

The semiconductor pressure sensor constructed in accordance with the principle of the present invention will be compared with the prior art.

In accordance with the present invention, the diaphragm film 48 and the insulation protective film 52 are formed on the sacrificial film 42 which is of a flat configuration and which includes the vanishable portion 44 and the diaphragm support portion 46. When the etching solution is poured into the sensor assembly through the inlet port 58, the vanishable portion 44 of the diaphragm film 48 is etched and removed by the etching solution to form the movable diaphragm 100. Thus, the diaphragm film 48 will be formed to be a flat structure which is fixedly supported by the diaphragm support portion 46 of the sacrificial film 42. This is apparently distinguished from the prior art in which the peripheral section of the pressure receiving region of the diaphragm has a stepped structure.

It is thus to be understood that the semiconductor pressure sensor of the present invention can stably and accurately measure pressure for a prolonged time period since the diaphragm film 48 defining the movable diaphragm 100 is flat supported by the diaphragm support portion 46 without any stepped structure.

In addition, the movable diaphragm 100 has no initial deflection which would be otherwise created due to the internal tensile stress in the prior art. Thus, even the semiconductor pressure sensor having such a structure as shown in FIG. 6 can measure pressure more stably and accurately.

As will be apparent from the foregoing, the present invention eliminates any stepped structure at the peripheral area of the movable diaphragm by forming the diaphragm film into a flat configuration. Therefore, the semiconductor pressure sensor according to the present invention can more accurately measure pressure for a prolonged time period. This can be supported by the fact that the movable diaphragm has no initial deflection due to the internal tensile stress therein.

DETAILED DESCRIPTION OF THE PREFERRED EMBODIMENTS

Figure 1:
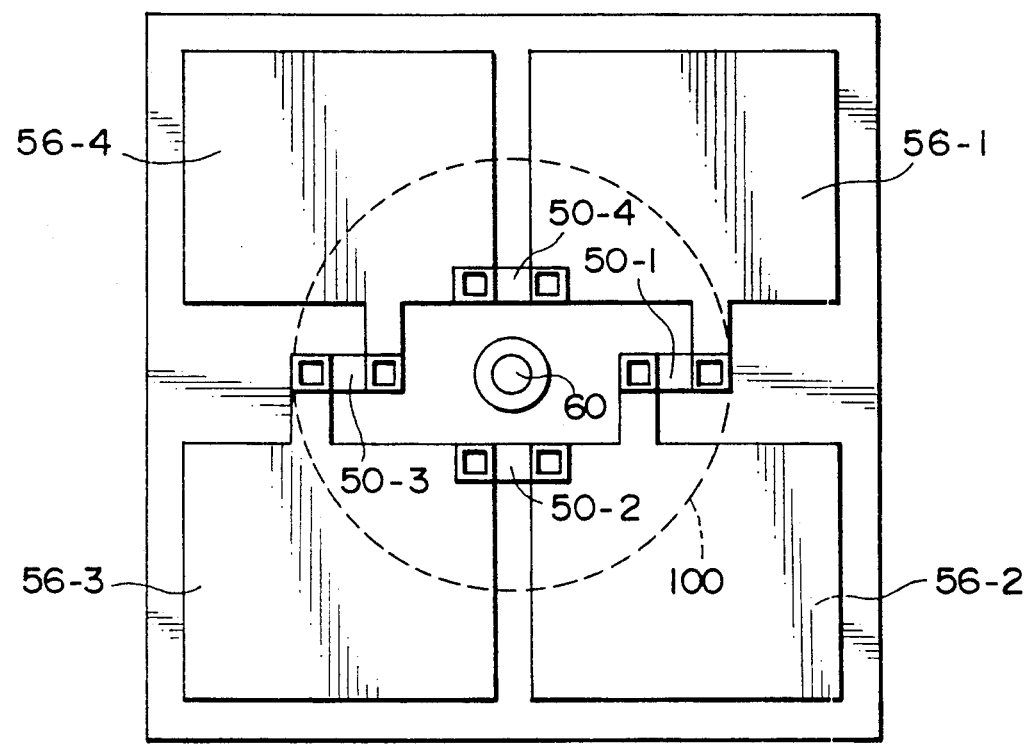
FIGS. 1 and 2 illustrate the first preferred embodiment of a semiconductor pressure sensor constructed in accordance with the present invention.

The present invention will now be described in more detail in connection with some preferred embodiments thereof which are illustrated in the drawings.

First Embodiment

Figure 2:
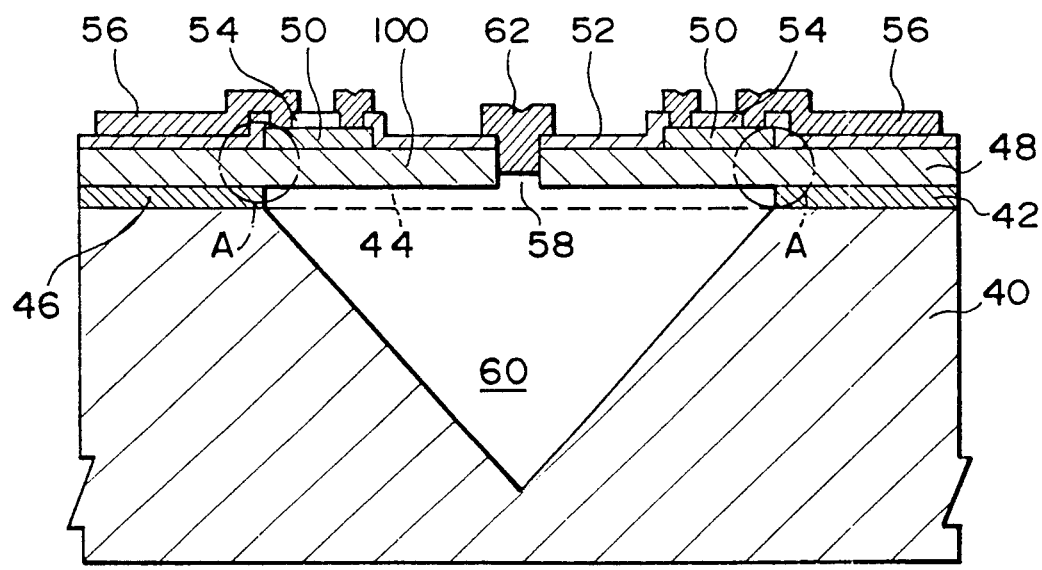

FIGS. 1 and 2 shows the first preferred embodiment of a semiconductor pressure sensor constructed according to the present invention.

The semiconductor pressure sensor comprises a semiconductor substrate 40 of single-crystal silicon and a sacrificial film 42 formed on the substrate 40 through the entire major surface thereof.

In this embodiment, the sacrificial film 42 is a polycrystalline silicon film which is formed on the major surface of the single-crystal silicon substrate 40 into a thickness of 200 nm, using the Low Pressure CVD process. The sacrificial film 42 is formed with P+-type semiconductor region having an concentration of impurity equal to $1 \times 10^{20}$ cm$^{-3}$ which may be obtained by adding and diffusing boron as impurity into the region of the sacrificial film 42 corresponding to a diaphragm support portion 46, using the thermal diffusion or ion implantation technique. The region into which the impurity is added and diffused is formed to have an etching-resistant property and adapted to function as a diaphragm support portion 46 having the etching-resistant property. The other pressure receiving region of the sacrificial film 42 which has no impurity functions as a vanishable portion 44 of polycrystal silicon having an isotropic etching property.

After the sacrificial film 42 has been formed over the major surface of the single-crystal silicon substrate 40, this major surface is then covered wholly with a diaphragm film 48 of silicon nitride having a thickness of 100 nm.

The diaphragm film 48 includes strain gauges 50-1, 50-2, 50-3 and 50-4 which are located in place on the surface thereof. In this embodiment, these strain gauges 50 are formed by coating the surface of the diaphragm film 48 with a polycrystalline silicon film having a thickness of 200 nm by the use of the Low Pressure CVD process; adding and diffusing boron as impurity into the polycrystalline silicon film to form a P-type semiconductor by the use of the thermal diffusing or ion implanting method; and thereafter partially removing the semiconductor region into the desired configuration by the use of the photo-etching process.

All the strain gauges 50 and diaphragm film 48 are then covered with an insulation protective film 52 of silicon nitride having a thickness equal to 300 nm, using the Low Pressure CVD process.

In such a manner, the major surface of the substrate 40 is covered with the vanishable portion 44, diaphragm film 48 and insulation protective film 52. At a predetermined location in the pressure receiving region, thereafter, an etching solution inlet port 58 having a diameter equal to 5 μm is formed through the material of the insulation protective film 52 and diaphragm film 48 to reach the vanishable portion 44, using the photo-etching technique. An anisotropic etching solution will be poured into the substrate 40 through the inlet port 58.

In this embodiment, the anisotropic etching solution is a solution of 10% by weight potassium hydroxide (KOH). When such a solution is poured into the assembly through the inlet port 58, the etching proceeds from the center toward the periphery of the assembly.

Figure 11A:
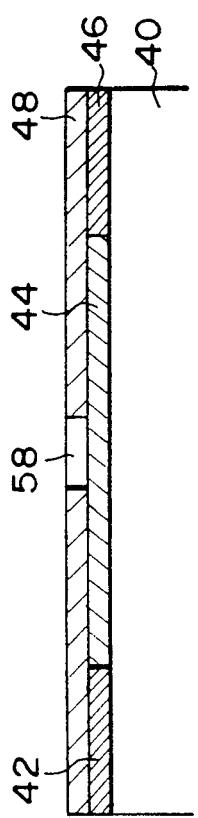
FIGS. 11a–11d illustrate the various steps of forming a reference pressure chamber in the process of making a semiconductor pressure sensor according to the present invention.
Figure 11B:
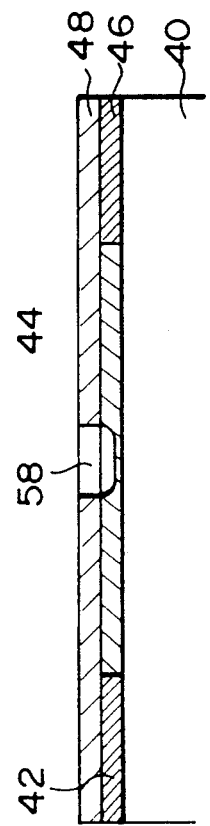
Figure 11C:
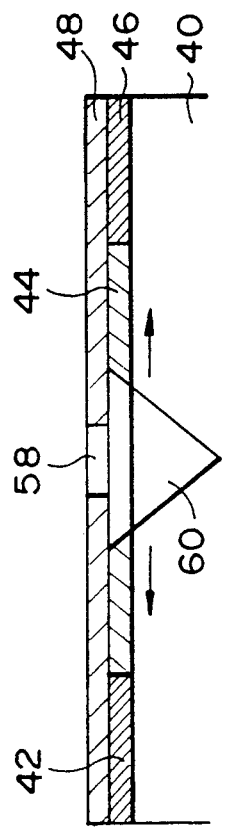
Figure 11D:
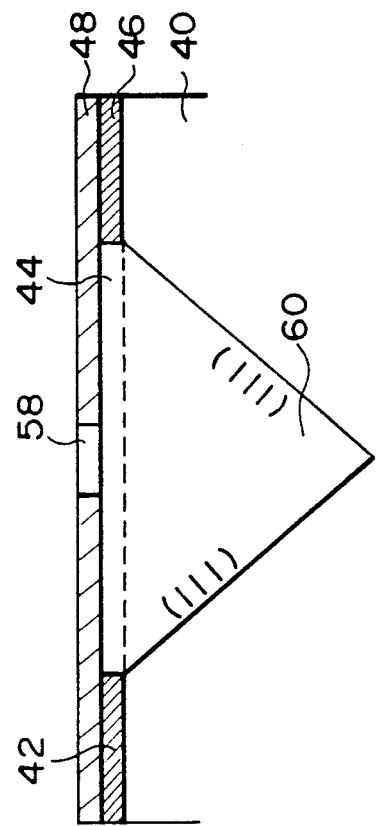
Figure 12:
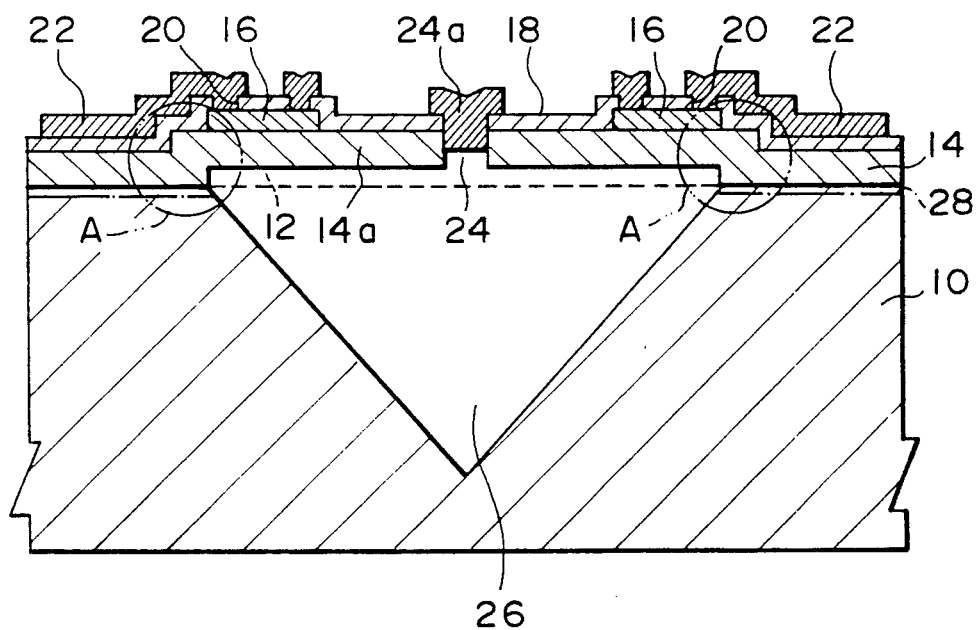
FIG. 12 schematically illustrates a semiconductor pressure sensor and a method of making the same, according to the prior art.

More particularly, the vanishable portion 44 is etched and removed transversely at a given speed by the etching solution poured through the inlet port 58, as shown in FIGS. 11(b) and 11(c). At the same time, the silicon substrate is etched longitudinally up to a given depth to form a cavity which is to define a reference pressure chamber 60, as shown in FIG. 11.

At this stage, the diaphragm film 48 and insulation protective film 52 located on the upper side of the reference pressure chamber 60 will not be substantially etched since they are made of the etching-resistant material, that is, silicon nitride. Thus, the pressure receiving region of a stack which consists of the diaphragm film 48 and the insulation protective film 52, that is, one including the vanishable portion 44 will function as a movable diaphragm 100 for the reference pressure chamber 60.

In accordance with the present invention, particularly, the diaphragm film 48 is of a flat configuration without any stepped portion. Therefore, the movable diaphragm 100 can be supported stably and firmly by the diaphragm support portion 46.

Furthermore, the strain gauges 50 will not be affected by the etching solution since they are sandwiched between the diaphragm film 48 and the insulation protective film 52.

After the reference pressure chamber 60 and the movable diaphragm 100 have been formed in the above-mentioned manner, a metallic or insulation material is then deposited on the insulation protective film 52 into a thickness sufficient to seal the etching liquid inlet port 58, by the use of the vacuum deposition or sputtering process. Then, any unnecessary material is removed to form a sealing member 62 using the photo-etching technique.

In such a manner, the reference pressure chamber 60 will be sealingly closed by the sealing member while the interior of the chamber 60 is maintained vacuum.

Thereafter, contact holes 54 are formed in the insulation protective film 52 at locations corresponding to the respective ends of the strain gauges by the use of the photo-etching technique. The peripheral region of each of the contact holes 54 is covered with a vacuum deposited film of aluminum and thereafter the aluminum film being shaped to form an electrode 56 by the use of the photo-etching process.

In such an arrangement, the semiconductor pressure sensor constructed according to this embodiment can detect an absolute pressure applied to the front face of the diaphragm 100 as a change of resistance in the strain gauge 50 in the form of a signal directly proportional to the absolute pressure through the electrodes 56.

In this embodiment, the diaphragm 100 can be more precisely formed into a smaller configuration having a diameter of 50 μm and a thickness of 0.5 μm. Experiments have proved that the semiconductor pressure sensor constructed according to this embodiment has a superior sensitivity equal to or higher than 2 mV/V at a pressure of 100 KPa.

Further experiments have proved that the pressure sensor has a superior linearity equal to or lower than ±0.5% F.S. at an absolute pressure of 500 KPa. In accordance with the first embodiment, it is understood that the semiconductor pressure sensor having a smaller size and an improved sensitivity can be provided with a diaphragm stably and firmly supported therein.

Second Embodiment

The second preferred embodiment of the present invention will be described in connection with a differential pressure measurement type sensor, in which similar parts to those of the first embodiment are denoted by similar reference numerals and will not be further described.

Figure 3:
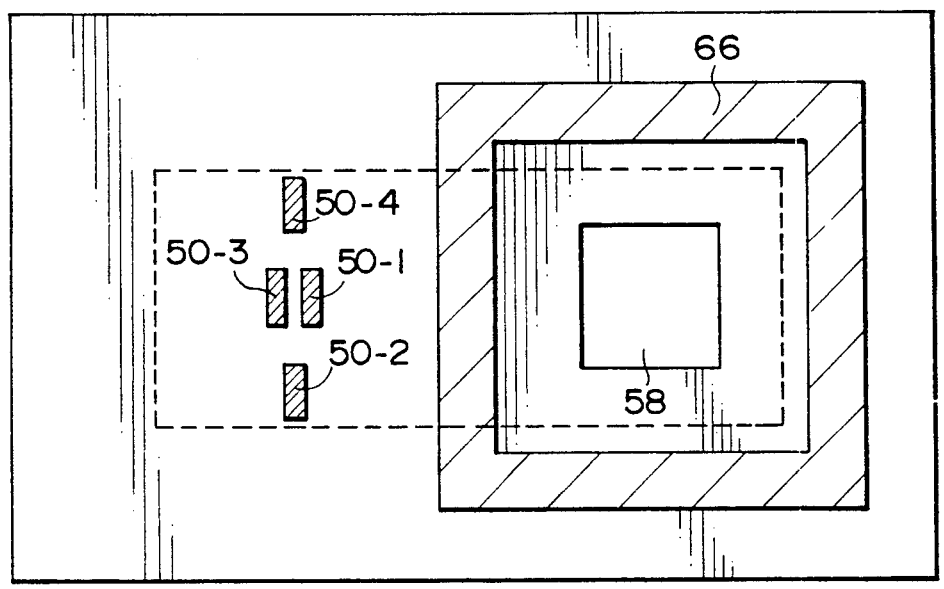
FIGS. 3 and 4 schematically illustrate the second preferred embodiment of a semiconductor pressure sensor constructed in accordance with the present invention.
Figure 4:
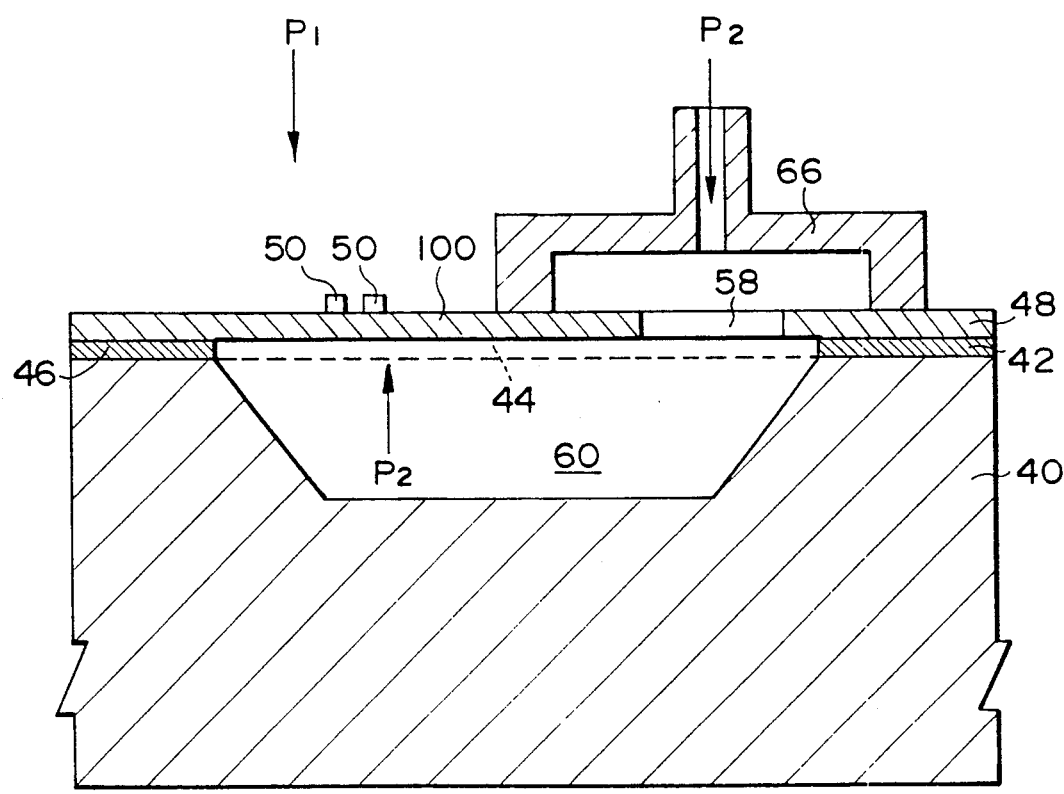

FIG. 3 is a plan view of a sensor constructed according to the second preferred embodiment while FIG. 4 is a schematic cross-section of the sensor shown in FIG. 3.

In the second embodiment, the surface of the single-crystal silicon substrate 40 is covered with a sacrificial film 42 of polycrystal silicon having a rectangular configuration. The pressure receiving region of the sacrificial film 42 is formed as a vanishable portion 44 and the portion around the vanishable portion 44 is formed as a diaphragm support portion 46 As in the first embodiment, a diaphragm film 48, strain gauges 50, an insulation protective film 52 and an etching solution inlet port 58 also are formed on the substrate 40.

As an anisotropic etching solution comprising a solution f potassium hydroxide (KOH) is poured into the assembly through the inlet port 58, the vanishable portion 44 is etched by the etching solution to form a rectangular-shaped cavity, resulting in a reference pressure chamber 60 and a movable diaphragm 100, as shown in FIGS. 3 and 4.

The second embodiment is characterized by that the strain gauges 50 are formed on one half of the pressure receiving region of the rectangular diaphragm 100 while the etching solution inlet port. 58 is formed on the other half of the pressure receiving region. The other half of the pressure receiving region of the movable diaphragm 100 includes a pressure inducting cap 66 leading to the inlet port 58, through which the second pressure is applied to the reference pressure chamber 60.

In such an arrangement, the first and second pressures $P_1$, $P_2$ are applied respectively to the front and back faces of thediaphragm 100 to create a strain directly proportional to a differential pressure across the movable diaphragm 100. As a result, the strain gauges 50 can generate an electric signal directly proportional to this differential pressure.

For such a purpose that the second embodiment is better understood, the description of insulation protective film 52, contact holes 54 and electrodes 56 will be omitted. It is of course that these components are similarly used in the second embodiment.

Third Embodiment

Figure 5:
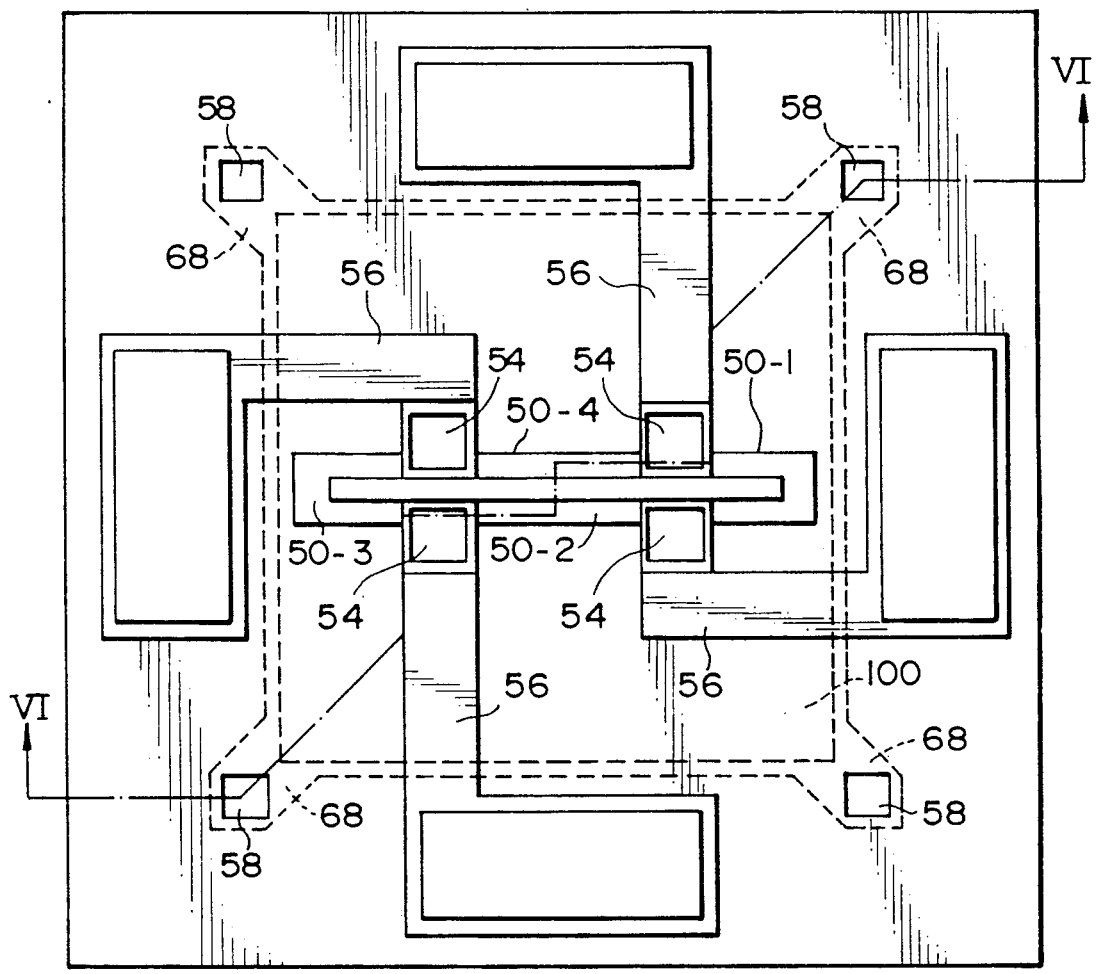
FIGS. 5 and 6 schematically illustrate the third preferred embodiment of a semiconductor pressure sensor constructed in accordance with the present invention.
Figure 6:
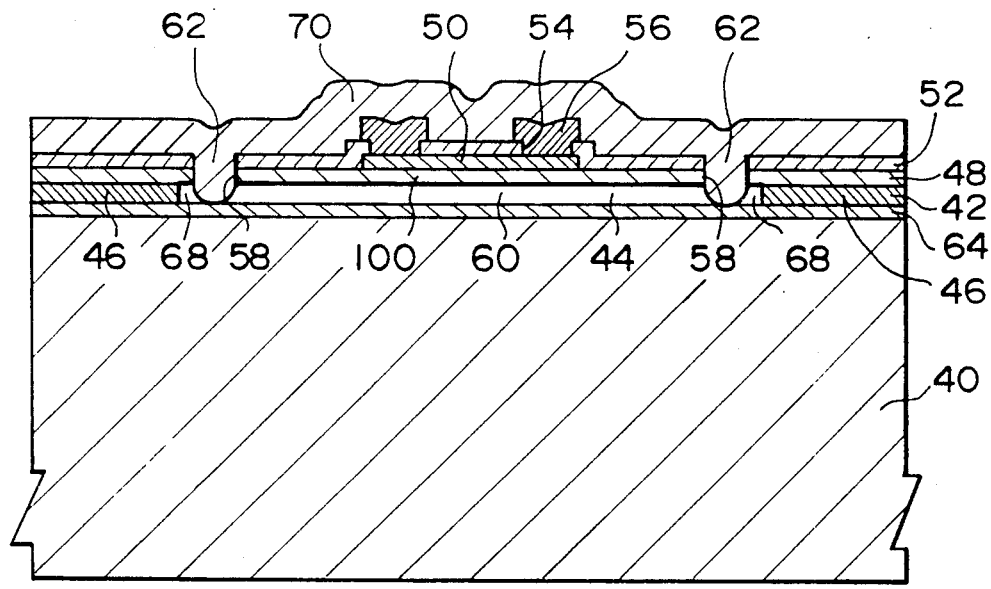

FIG. 5 is a plan view showing the outline of the third preferred embodiment of a semiconductor pressure sensor constructed in accordance with the present invention while FIG. 6 is a schematic cross-section of the pressure sensor, taken along a line VI—VI in FIG. 5. Also in the third embodiment, similar parts to those of the aforementioned embodiments will be denoted by similar reference numerals and will not be further described.

The semiconductor pressure sensor of this embodiment comprises a semiconductor substrate 40 of single-crystal silicon and a sacrificial film 42 formed on the major surface of the substrate 40 through the entire area thereof. Similarly, the sacrificial film 42 includes a vanishable portion 44 and a diaphragm support portion 46.

The third embodiment is characterized by that the sacrificial film 42 is formed according to the following procedure:

An insulation film 64 of silicon nitride ($Si_3N_4$) is first formed on the entire major region of the substrate 40 up to a thickness of 100 nm by the use of the Low Pressure CVD process. The sacrificial film 42 is formed over the insulation film 64 up to a thickness of 200 nm by the use of the Low Pressure CVD process. The region of the sacrificial film 42 corresponding to the diaphragm support portion 46 is then treated to have an etching-resistant property as in the first embodiment. Thus, the diaphragm support portion 46 and the vanishable portion 44 are simultaneously formed.

In this embodiment, the vanishable portion 44 is formed into a square configuration with four corners thereof having regions 68 which extend therefrom outwardly.

The sacrificial film 42 is further covered entirely with a diaphragm film 48 of silicon nitride which is formed thereon up to a thickness of 100 nm by the use of the Low Pressure CVD process.

The pressure receiving region of the diaphragm film 4 includes strain gauges 50-1, 50-2, 50-3 and 50-4 formed therein by the use of the vacuum CVD and photo-etching techniques, as in the first embodiment. These strain gauges 50 and the entire diaphragm film 48 are then covered with an insulation protective film 52 of silicon nitride up to a thickness of 300 nm by the use of the Low Pressure CVD process.

As shown in FIG. 5, each of the four extending regions 68 includes an etching solution inlet port 58 formed therein to extend through the insulation protective film 52 and the diaphragm film 48 to reach the vanishable portion 44 of the sacrificial film 42.

When an etching solution is poured into the assembly through the respective inlet ports 58, only the vanishable portion 44 is etched and removed to form a reference pressure chamber 60 and a movable diaphragm 100.

Thereafter, contact holes 54 are formed in the insulation protective film 52 at locations corresponding to the respective ends of the strain gauges 50. Electrodes 56 are then formed through the respective contact holes 54.

Next, a film of silicon nitride 70 is formed over the entire region of the insulation protective film 52 up to a thickness of 1 μm by the plasma CVD process.

The silicon nitride film 70 defines a sealing member 62 for sealingly closing the etching solution inlet ports 58 and also functions as a passivation for the sensor face.

In this embodiment, the movable diaphragm 100 can be formed into a smaller square-shaped configuration having each side length equal to 80 μm and a film thickness equal to 1.4 μm. Experiments have proved that the movable diaphragm has a superior sensitivity equal to or higher than 3 mV/V at a pressure of 100 KPa.

The deflection in the movable diaphragm 100 is about 60 nm at a pressure of 100 KPa. Since the spacing between the movable diaphragm 100 and the insulation film 64 formed on the entire major region of the substrate 40 is equal to 200 nm in this embodiment, the movable diaphragm 100 can be used to measure a pressure up to 200 KPa stably and accurately. Further experiments have proved that the movable diaphragm 100 has a superior linearity equal to or less than 0.3% F.S. at the above range of pressure.

In the third embodiment, similarly, the movable diaphragm 100 can be supported stably and firmly and yet formed precisely with decreased size and thickness. Thus, the third embodiment can realize a semiconductor pressure sensor having a reduced size and an improved sensitivity.

If an excessive pressure exceeding 300 KPa is applied to the semiconductor pressure sensor, the movable diaphragm 100 will be brought into contact with the insulation film 64 without further deflection. The movable diaphragm 100 will not be destroyed by such an excessive pressure.

Fourth Embodiment

The present invention will be described in connection with the fourth preferred embodiment, in which similar parts to those of the aforementioned embodiments are denoted by similar reference numerals and will not be further described.

Figure 7:
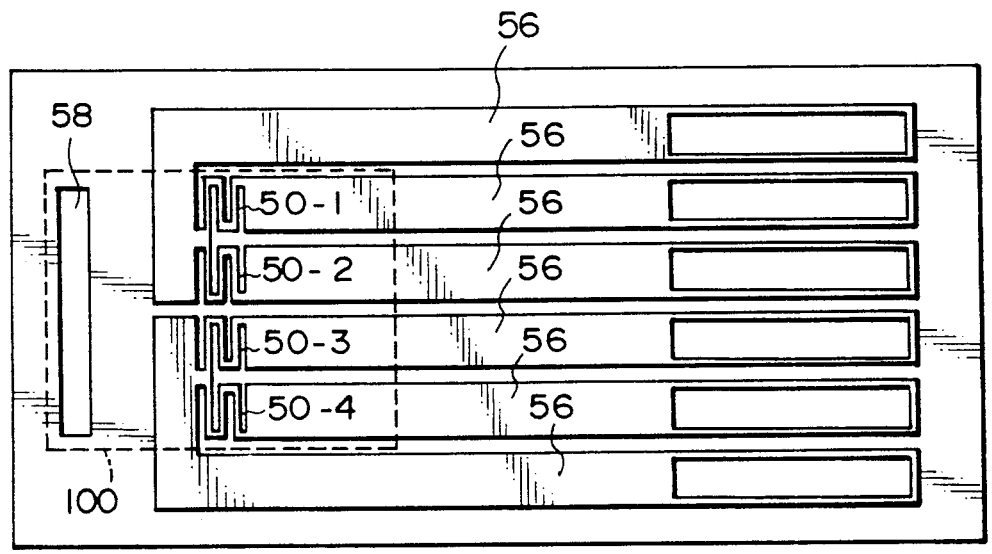
FIGS. 7 and 8 schematically illustrate the fourth preferred embodiment of a semiconductor pressure sensor constructed in accordance with the present invention.
Figure 8:
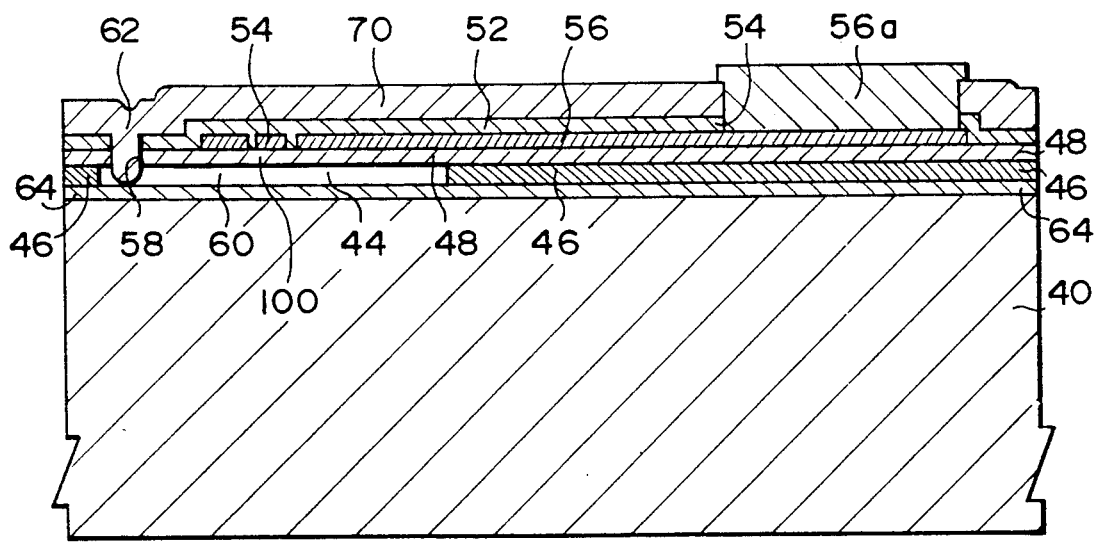

FIG. 7 is a plan view of a sensor according to the fourth embodiment while FIG. 8 is a schematic cross-section of the sensor shown in FIG. 7.

As in the third embodiment, the semiconductor pressure sensor comprises a substrate 40 and an insulation film 64 formed over the major surface of the substrate 40. A sacrificial film 42 is formed over the entire region of the insulation film 64. The sacrificial film 42 includes a diapragm support portion 46 treated to have an etching-resistant property, as in the first embodiment. The sacrificial film 42 also includes a vanishable portion 44 corresponding to the pressure receiving region, which is of a square-shaped configuration having each side equal to 100 μm.

A diaphragm film 48 is then formed over the entire surface region of the sacrificial film 42. The diaphragm film 48 includes a plurality of strain gauges 50-1, 50-2, 50-3 and 50-4 which are formed in place on the pressure receiving region of the diaphragm film 48, as shown in FIG. 7. The strain gauges 50-1 50-4 are connected with the respective electrodes 56 each of which extends to the other end of the substrate 40 across the movable diaphragm 100.

An insulation protective film 52 is then formed over the entire surface area of the diaphragm film 48 with the strain gauges 50 and electrodes 56. As in the third embodiment, an etching solution inlet port 58 is formed through the assembly at one end. By pouring the etching solution through the inlet port 58, the vanishable portion 44 is etched and removed to form a square-shaped movable diaphragm 100 and a reference pressure chamber 60.

Thereafter, a film of silicon nitride 70 is formed over the insulation protective film 52 up to a given thickness to form a sealing member 62 for sealingly close the etching solution inlet port 58, as in the third embodiment.

At the other end of the substrate 40, contact holes 54 are formed in the silicon nitride film 70 to connect with electrodes 56. Each of the contact holes 54 receives a connection terminal 56a.

The semiconductor pressure sensor constructed according to the fourth embodiment can be preferably used as a sensor for measuring pressure in various types of liquids and living bodies since the substrate 40 includes the movable diaphragm 100 at one end with the other end having connection terminals 56a, the electrodes 56 being not exposed on the side of the movable diaphragm 100.

Experiments have proved that the semiconductor pressure sensor of this embodiment can have a substrate which is miniaturized into a small shape having its dimensions 150 μm × 500 μm. Therefore, it is said that the fourth embodiment can realize a semiconductor pressure sensor having very reduced dimensions.

Fifth Embodiment

The fifth preferred embodiment of the present invention is characterized by that a semiconductor pressure sensor is integrally formed with an integrated circuit.

Figure 9:
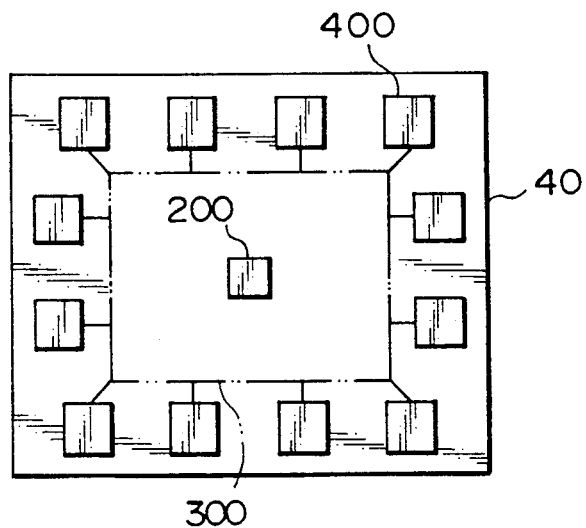
FIG. 9 illustrates the fifth preferred embodiment of a semiconductor pressure sensor constructed in accordance with the present invention.
Figure 10:
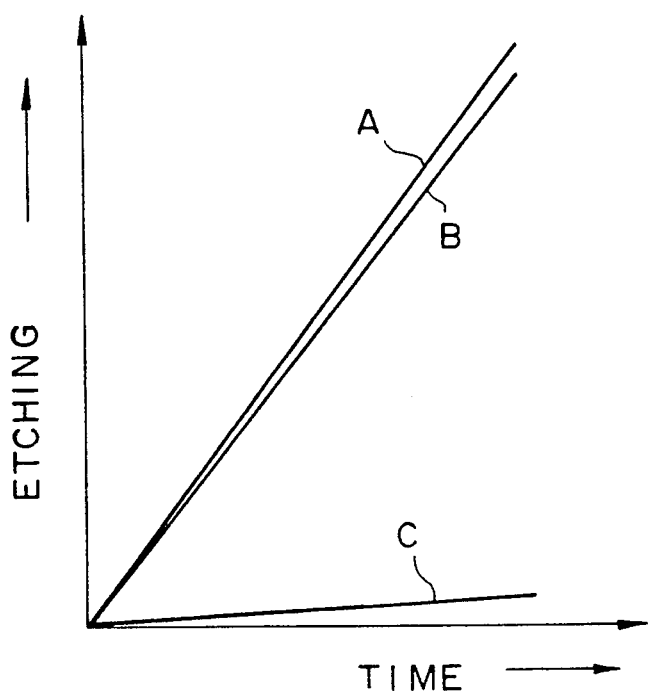
FIG. 10 is a graph illustrating the etching properties in various sensor components of the semiconductor pressure sensor according to the present invention.

FIG. 9 is a plan view showing a semiconductor pressure sensor constructed according to the fifth embodiment of the present invention. In this embodiment, a semiconductor pressure sensor 200 as described in connection with the first and third embodiments is formed on a silicon substrate 40 in place. There are further formed on the silicon substrate 40 an integrated circuit 300 for amplifying and processing signals from the pressure sensor 200, leads for connecting the pressure sensor 200 with the integrated circuit 300 and a plurality of electrodes 400 for connecting the circuit with external instruments.

In accordance with this embodiment, the semiconductor pressure sensor can be miniaturized sufficiently to appear as one of the components in the integrated circuit. Furthermore, the pressure sensor may be manufactured by treating it only on one side and yet by the use of the same manufacturing steps as in the integrated circuit.

It is thus to be understood that the present invention can provide a so-called integrated sensor by incorporating the semiconductor pressure sensor section into the integrated circuit.

Other Embodiments

The previous embodiments of the present invention have been described as to a case where the diaphragm support portion 46 contains an impurity such as boron having a concentration of impurity equal to $1 \times 10^{20}$ cm$^{-3}$ and the concentration of the etching solution (KOH) is equal to 10% by weight. However, the present invention is not limited to such examples and may be applied in many other forms if the concentration of impurity in the diaphragm support portion 46 and the concentration of potassium hydroxide solution used as the etching solution are selected such that the etching will be controlled up to one-tenth for the vanishable portion 44 of polycrystalline silicon and the substrate 40 of single-crystal silicon.

Although the previous embodiments have been described as to a case where the diaphragm film 48 and the insulation protective film 52 are formed of silicon nitride, they may be made of any other insulation material which can be stably deposited on the silicon substrate 40 and etched at a speed very slower than that of the silicon, such as alumina (Al$_2$O$_3$), sapphire (Al$_2$O$_3$), calcium fluoride (CaF$_2$) and so on.

Although the previous embodiments have been described as to a case where the strain gauges 50 are made of polycrystalline silicon, the strain gauges may be formed of a single-crystal silicon obtained from the re-crystallization of a polycrystalline silicon to improve the sensitivity. The other materials may be used to form the strain gauges if they can be stably deposited on the diaphragm film with its sufficient piezoresistance effect.

Although the previous embodiments have been described as to a case where the vanishable portion 44 having the isotropic etching property is formed of polycrystalline silicon, the present invention is not limited to such a case and may utilize many other suitable materials if they have a transverse etching property faster than the boundary between the semiconductor substrate 40 and the diaphragm film 48. Such materials include phosphoreted glass and others.

The present invention can provide a semiconductor pressure sensor having a reduced size and an improved sensitivity, which can be broadly utilized in various applications such as barometer, tonometer, vehicle engine controlling pressure sensor, pressure transmitting device, living body pressure measuring sensor, robot controlling pressure sensor and so on.

We claim:

1. A semiconductor pressure sensor comprising:
   a semiconductor substrate;
   a sacrificial film including a vanishable portion covering a pressure receiving region in a major surface of said semiconductor substrate and a diaphragm support portion formed around said region and formed on said major surface of said substrate, said vanishable portion being formed to have an isotropic etching property along said pressure receiving region and said diaphragm support portion being formed to have an etching-resistant property;
   an insulation diaphragm film formed to be flat on said sacrificial film, said insulation diaphragm film having an etching-resistant property;
   at least one etching solution inlet port formed to extend through said insulation diaphragm film to the vanishable portion of said sacrificial film;
   a reference pressure chamber formed by etching and removing at least the vanishable portion of said sacrificial film with an etching solution fed through said etching solution inlet port;
   pressure maintaining means connected to said inlet port for maintaining a reference pressure in said reference pressure chamber; and
   at least one strain gauge formed on said insulation diaphragm film in place at the pressure receiving region thereof.

2. A semiconductor pressure sensor as defined in claim 1, further comprising an insulation film having an etching-resistant property which is formed between said semiconductor substrate and said sacrificial film and wherein said reference pressure chamber is formed by etching and removing only the vanishable portion of said sacrificial film with the etching solution poured through said inlet port.

3. A semiconductor pressure sensor as defined in claim 2 wherein the diaphragm support portion of said sacrificial film is formed of polycrystalline silicon into which boron is ion implanted or thermally diffused.

4. A semiconductor pressure sensor as defined in claim 3, further comprising an insulation passivation film with an etching-resistant property covering over said diaphragm film and said strain gauge and wherein said insulation passivation film includes contact holes formed therethrough to extend to the predetermined locations of said strain gauge and wherein a plurality of electrodes are connected with the respective strain gauge through said contact holes.

5. A semiconductor pressure sensor as defined in claim 2, further comprising an insulation passivation film with an etching-resistant property covering over said diaphragm film and said strain gauge and wherein said insulation passivation film includes contact holes formed therethrough to extend to the predetermined locations of said strain gauge and wherein a plurality of electrodes are connected with the respective strain gauge through said contact holes.

6. A semiconductor pressure sensor as defined in claim 1 wherein the diaphragm support portion of said sacrificial film is formed of polycrystalline silicon into which boron is ion implanted or thermally diffused.

7. A semiconductor pressure sensor as defined in claim 6, further comprising an insulation passivation film with an etching-resistant property covering over said diaphragm film and said strain gauge and wherein said insulation passivation film includes contact holes formed therethrough to extend to the predetermined locations of said strain gauge and wherein a plurality of electrodes are connected with the respective strain gauge through said contact holes.

8. A semiconductor pressure sensor as defined in claim 1, further comprising an insulation passivation film with an etching-resistant property covering over said diaphragm film and said strain gauge and wherein said insulation passivation film includes contact holes formed therethrough to extend to the predetermined locations of said straign gauge and wherein a plurality of electrodes are connected with the respective strain gauge through said contact holes.

9. A semiconductor pressure sensor as defined in claim 8, comprising contact hole means formed in said insulation passivation film to extend to the predetermined location of said strain gauge; electrode means formed on said insulation passivation film, said electrode means being connected, at one end, with said strain gauge through said contact hole means, and the other end of said electrode means extending to a region outside of said diaphragm film; and a second insulation passivation film formed over said insulation passivation film for sealingly closing said etching solution inlet port and for protecting at least said electrode means on said diaphragm film.

10. A semiconductor pressure sensor as defined in claim 1, said pressure maintaining means comprising at least one sealing member for sealing said etching solution inlet port, and wherein said reference pressure chamber is sealingly closed by said sealing member while the interior thereof is maintained vacuum and wherein an absolute pressure applied to said diaphragm film is to be measured by said semiconductor pressure sensor.

11. A semiconductor pressure sensor as defined in claim 1 wherein said pressure maintaining means is a pressure inducting means for inducting the first pressure and wherein said semiconductor pressure sensor is adapted to measure a difference between the first pressure applied to said reference pressure chamber through said pressure inducting means and the second pressure applied to the surface of said insulation diaphragm film.

* * * * *